May 13, 1947.  W. J. DYKOSKI  2,420,637
GLASS SURFACE PLATE
Filed Jan. 26, 1945
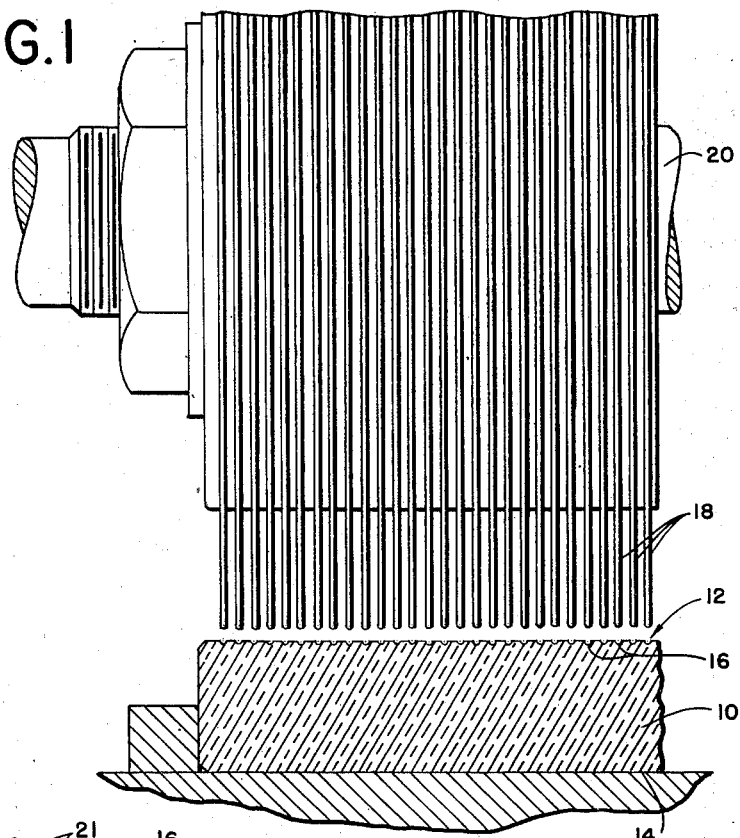
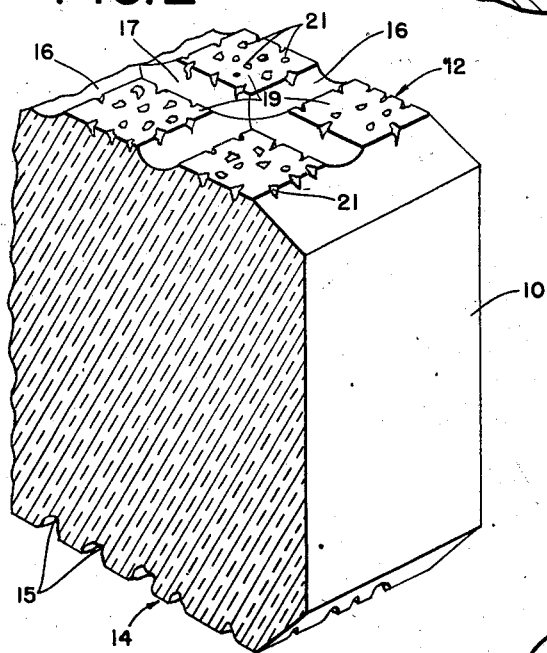
INVENTOR:-
WALTER J. DYKOSKI
BY *Arthur R. Wylie*
ATTY.

Patented May 13, 1947

2,420,637

UNITED STATES PATENT OFFICE 2,420,637

GLASS SURFACE PLATE

Walter J. Dykoski, Minneapolis, Minn., assignor to General Mills, Inc., a corporation of Delaware Application January 26, 1945, Serial No. 574,781

1 Claim. (Cl. 33—174)

An object of this invention is the provision of an accurate glass surface plate which takes and holds bluing well and which properly transfers it to the high spots of flat surfaces rubbed thereon but to which such surfaces will not adhere.

This and other objects as will hereinafter appear are accomplished by this invention which is fully described in the following specification and shown in the accompanying drawing in which Figure 1 is a cross-section of a plate embodying the invention and showing the disks for cutting grooves therein; and Fig. 2 is a partial enlarged perspective of a corner of a glass surface plate.

The embodiment illustrated comprises a glass plate 10 of any desired size having its upper surface 12 and lower surface 14 rough ground in any well known manner, as on a disk commonly used for grinding glass surfaces.

After this the top surface 12 has a series of parallel grooves 16 cut therein by disks 18 spaced about 1/8" apart and secured on a shaft 20 driven parallel to the top of the surface plate. I prefer to cut also a similar series of cross grooves 17 by the same disks but for certain purposes the plate will operate with grooves cut in one direction only. The cross grooves 16, 17 form a series of lands or islands 19 whose surfaces lie in the same plane. This top surface is then finish ground in any well known manner using suitable abrasive on a steel disk, after which the surface is slightly uniformly pitted by means of a medium coarse abrasive and a small steel plate moved by hand for a few minutes over the top of the surface plate. This produces a series of pits 21 which are uniformly distributed and which act as reservoirs to help hold and distribute the bluing.

The top surface is then finish ground again for a few minutes on a steel plate to insure flatness and may now be used in much the same way as a scraped steel surface plate. It takes bluing very well and transfers it to high points of nearly flat surfaces rubbed thereover. The grooves serve not only to prevent flat objects from "ringing" to the top surface of the plate but appear to hold the bluing and to feed it gradually to the top surface and thence to objects as they are moved over the plate.

I also find that the grooves can be made as scratches provided they are deep enough and wide enough to prevent filling up with bluing paste and forming a suction on an object slid thereover. Pitting can also be done by a coarse abrasive or metal used in an air blast.

The bottom 14 may also be finish ground, not for transferring bluing but for use generally as a layout plate, for inspection, etc. For this purpose the grooves are omitted and deeper pits 15 are formed by the use of a coarser abrasive and a small steel plate moved by hand as before. This pitting prevents ringing and when scratches appear they are not so noticeable.

The glass plate could also be uniformly coated with a suitable acid-resisting material and a series of scratches are made in this material with a suitable blunt instrument, uncovering the plate at these lines, which are then etched to produce grooves with the surfaces between remaining as raised islands.

By doing the primary grinding on a surface grinder, such as the Blanchard type, using an annular end grinder, the surface is rendered flat and at the same time is abraded giving somewhat the same effect as by pitting, as above described, so as to hold and transfer bluing satisfactorily. Much the same result can be obtained by grinding the glass surface by means of a cylindrical grinding wheel whose axis is maintained parallel to the surface to be ground as the grinding wheel is moved back and forth over the glass surface while grinding it. This also holds and transfers bluing quite well when parallel grooves are formed therein as described above. The top surface is then ground just enough to insure flatness.

The islands and grooves could also be formed in the glass plate while being manufactured by casting or rolling when the glass is hot. The surface having the islands would then be rough ground, pitted and finish ground as before.

Such glass surface plates are economical to manufacture and in general are more accurate for long periods than scraped steel plates since glass is non-crystalline and hence has substantially no tendency to change its molecular structure after manufacture. They require no strain-aging as does iron and steel. This surface plate is also capable of longer use after bluing than a similar steel surface plate.

Thus it will be seen I have provided a simple and efficient form of surface plate and one which can be economically manufactured.

While I have shown and described but a few embodiments of my invention, it is to be understood that it is capable of many modifications. Changes, therefore, may be made which do not depart from the spirit and scope of my invention as disclosed in the appended claim.

I claim as my invention:

A glass surface plate having a flat finely ground surface broken by transverse channels spaced about ⅛" apart, the surface being pitted to hold and transfer bluing to the high points of flat objects rubbed thereover.

WALTER J. DYKOSKI.

REFERENCES CITED

The following references are of record in the file of this patent:

UNITED STATES PATENTS

| Number | Name | Date |
|---|---|---|
| 1,157,762 | Commons | Oct. 16, 1915 |
| 1,889,897 | Johansson | Dec. 6, 1932 |
| 1,449,118 | Hoke | Mar. 20, 1923 |

FOREIGN PATENTS

| Number | Country | Date |
|---|---|---|
| 112,581 | Great Britain | Jan. 17, 1918 |